United States Patent [19]

Bertelson

[11] 4,180,047

[45] Dec. 25, 1979

[54] ABOVE AND BELOW WATER AND LAND PILE CUTTING APPARATUS AND METHOD

[76] Inventor: George H. Bertelson, R.D. 2, Box 112, Neshanic Station, N.J. 08853

[21] Appl. No.: 922,378

[22] Filed: Jul. 6, 1978

[51] Int. Cl.² .......................................... B28D 1/04
[52] U.S. Cl. ........................................ 125/14; 51/40;
83/925 R; 144/34 R; 144/2 N; 144/323; 405/232
[58] Field of Search ....................... 83/925 R; 30/124;
144/34 R, 2 N, 323; 51/40, 90 R, 80 R; 125/13 R, 13 SS, 14, 23 R; 405/232, 256

[56] References Cited

U.S. PATENT DOCUMENTS

| 2,640,301 | 6/1953 | Hill | 51/40 |
|---|---|---|---|
| 3,364,960 | 1/1968 | Collins . | |
| 3,413,881 | 12/1968 | Stolzer . | |
| 3,667,515 | 6/1972 | Corey | 144/34 |
| 3,768,350 | 10/1973 | Coulter | 51/40 |
| 4,144,867 | 3/1979 | Wachs | 125/14 |

FOREIGN PATENT DOCUMENTS 937439 1/1956 Fed. Rep. of Germany .
49816 1/1941 Netherlands .

Primary Examiner—Harold D. Whitehead
Attorney, Agent, or Firm—Harold L. Stowell

[57] ABSTRACT

Above and below water and land pile cutting machine is provided having a main frame which is quadrangular in transverse cross-section and is shaped to receive in the center thereof the pile to be cut. The upper portion of the main frame carries extensible pile gripping clamp means; the center portion carries four circular saws each mounted on a carriage mounted for transverse reciprocation and the lower portion of the frame carries further pile gripping extensible clamping means.

10 Claims, 15 Drawing Figures

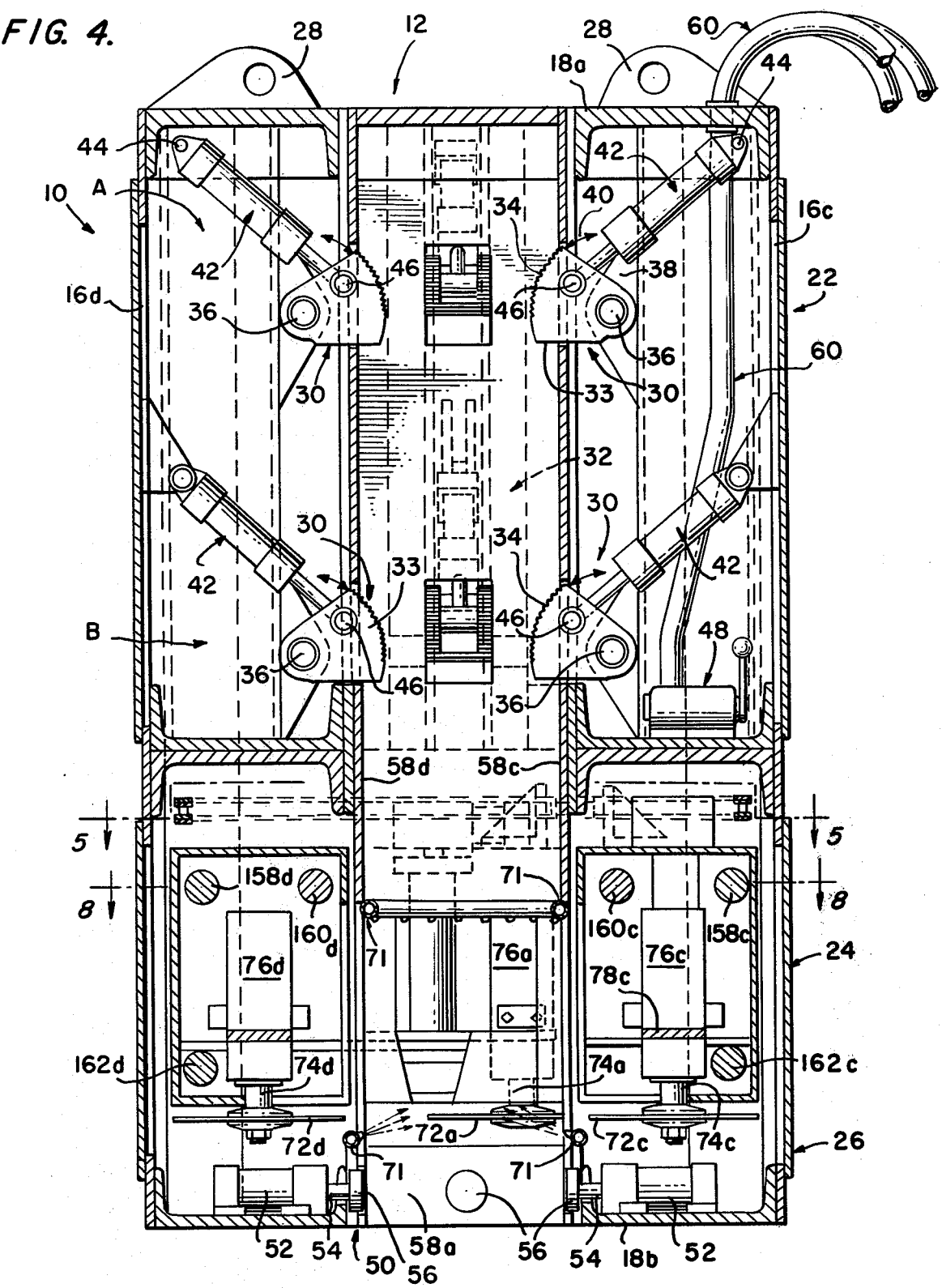

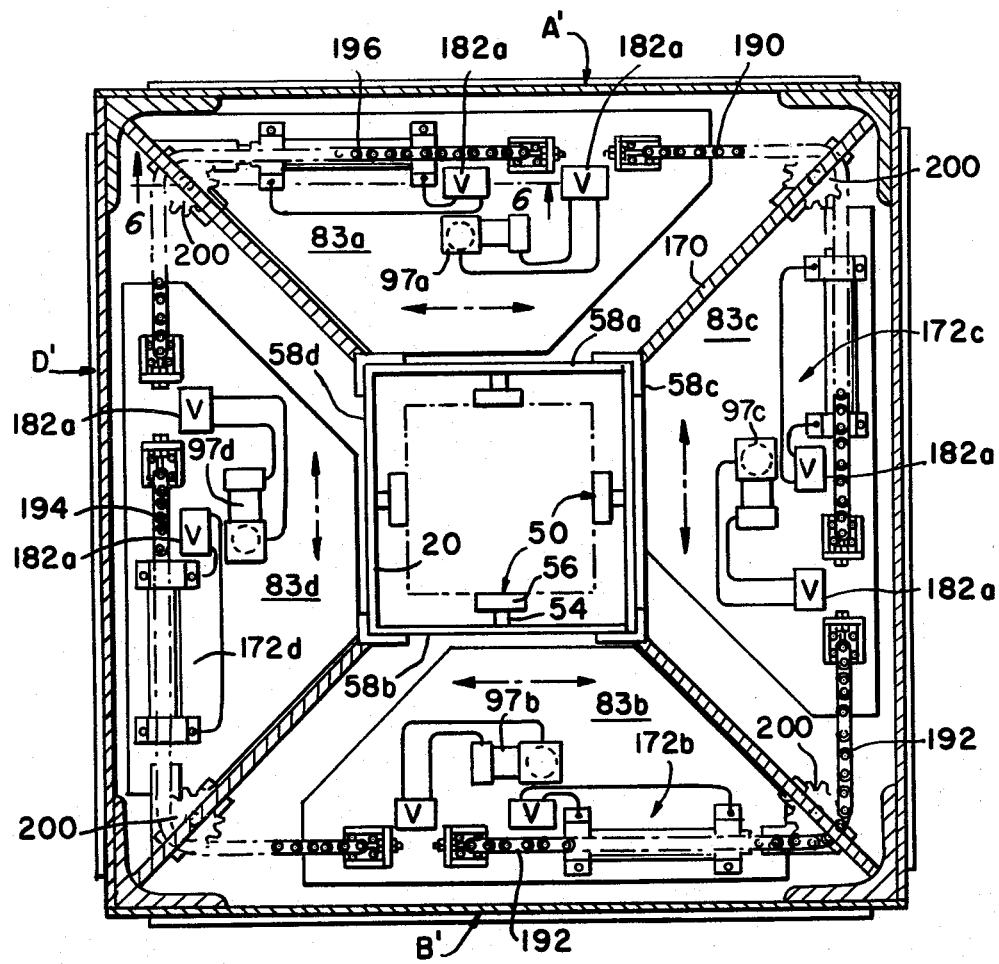
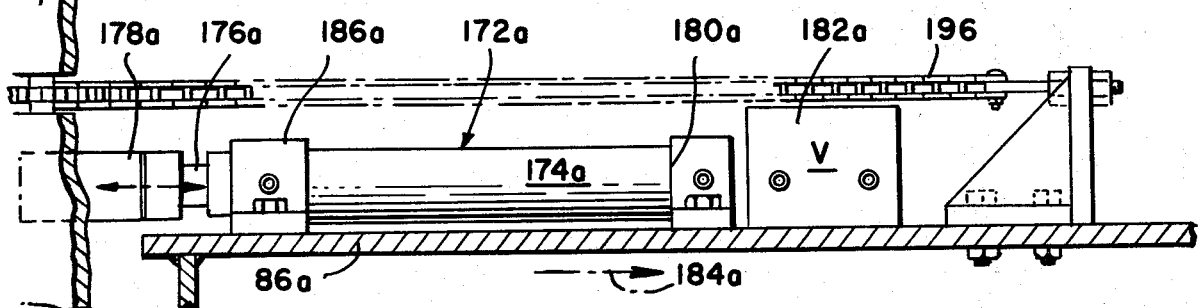
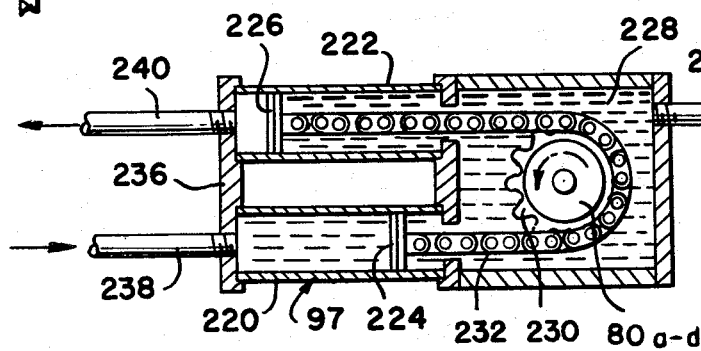

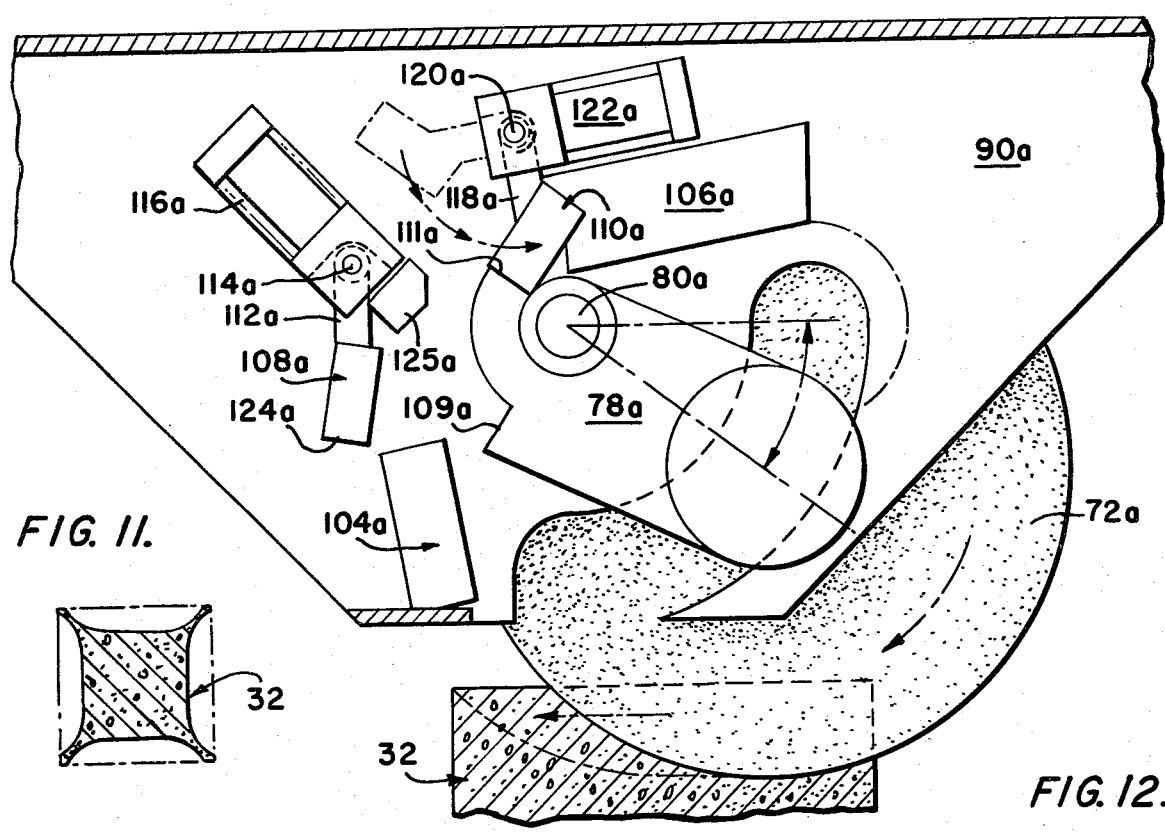
FIG. 10.
FIG. 11.
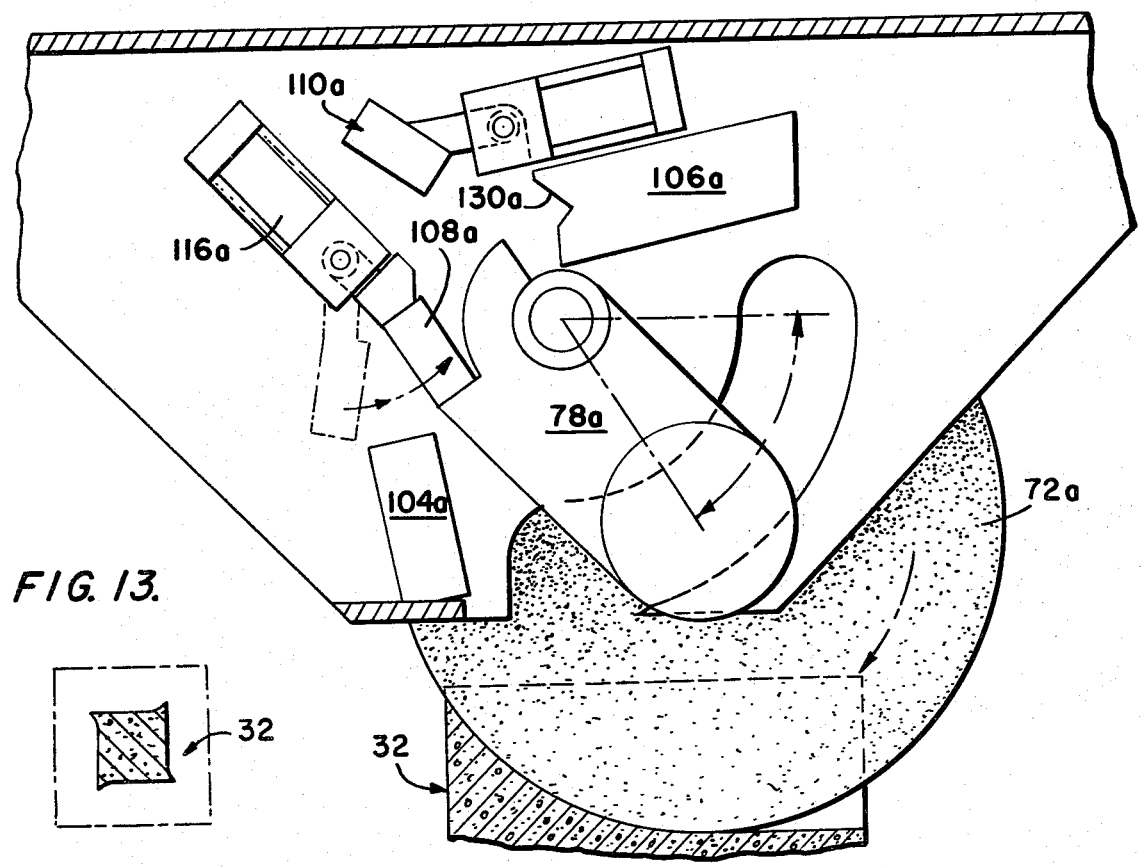
FIG. 12.
FIG. 13.

ABOVE AND BELOW WATER AND LAND PILE CUTTING APPARATUS AND METHOD

BACKGROUND OF THE INVENTION

1. FIELD OF THE INVENTION

The present invention is directed to a plural saw, pile cutting apparatus whierein the plural saws are contained in a frame provided with pile clamping means, with the pile clamping means positioned above and below the point where the pile is to be cut. The entire device is suspended from a material handling device which lowers the pile cutter onto a pile to be cut and retrieves the pile cutter and the cut portion of the pile.

2. DESCRIPTION OF THE PRIOR ART

U.S. Pat. No., Corey, 3,667,515, is exemplary of one form of pile cutting apparatus with the apparatus being suspended from a material handling machine. A single saw is employed in the Corey machine and Corey does not provide means for clamping the pile cutting apparatus to the pile to be cut above and below the saw cut, nor applicant's improved means for cut pile disposal.

U.S. Pat. Nos. Stolzer 3,413,881 and Coulter 3,768,350 are exemplary of plural circular saw type workpiece saws and are pertinent in that means are provided for bringing the saws into cutting relationship to the item to be severed.

SUMMARY OF THE INVENTION

The present invention generally comprises an under water, above water, or on land pile cutting machine having a main frame, which main frame is quadrangular in transverse cross-section and is shaped to receive a pile to be cut in a passage extending through the center of the frame. The frame extensibly supports a plurality of pile gripping clamp means in the upper portion thereof and a plurality of extensible pile clamp means in the lower portion thereof. The frame further supports a plurality of circular saw assemblies which are mounted between the upper and lower clamping means with the axis of rotation of each saw position parallel to the longitudinal axis of the pile to be cut. Each of the circular saws is mounted on a carriage which is mounted to the main frame for reciprocation in a plane normal to the axis of rotation of each saw assembly. Further, means are provided for swinging each saw toward and away from the pile to be cut and further means are provided for reciprocating each saw carriage.

BRIEF DESCRIPTION OF THE DRAWING

The invention will be more particularly described in reference to the accompanying drawings wherein:

FIG. 4 is a section substantially on line 3—3 of FIG. 1;

FIG. 5 is a section on line 5—5 of FIG. 4;

FIG. 6 is a fragmentary elevational view of one of the carriage actuating hydraulic rams;

FIG. 7 is a diagramatic view of one of the linear to rotary actuators.

FIG. 10 is an enlarged fragmentary view of a portion of the saw swinging mechanism;

FIG. 11 is a diagramatic view of a pile following the first cut;

FIG. 12 is a view like FIG. 10 with the saw in, for example, a second cutting position;

FIG. 13 is a view like FIG. 11 following the second saw cut;

DESCRIPTION OF THE PREFERRED EMBODIMENT

Figure 1:
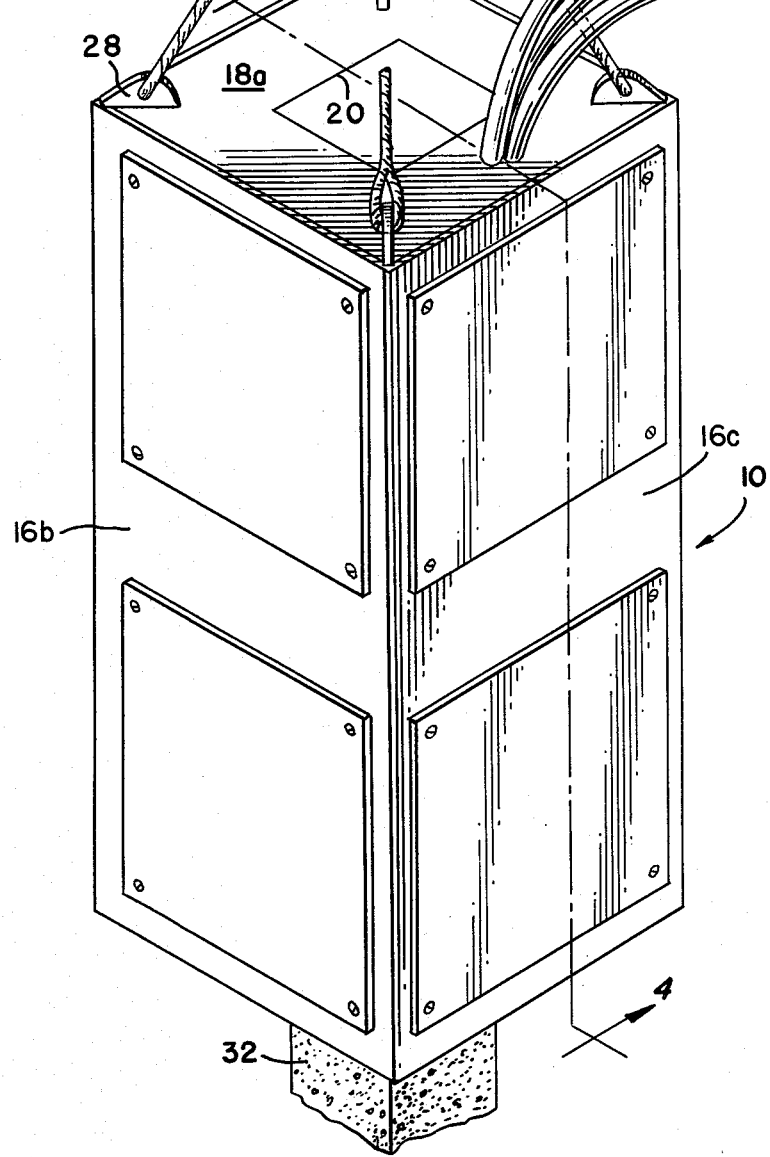
FIG. 1 is a perspective view of a pile cutting apparatus of the invention.

Referring to the drawing and particularly to FIGS. 1 through 10 generally designates the improved pile cutting apparatus of the present invention. The pile cutting apparatus includes a main frame or housing 12 of box-like configuration formed by four "L" shaped corner posts 14 to which are secured side panels 16a, b, c, and d and top and bottom panels 18a and b. As illustrated in FIG. 1, each side panel is provided with upper and lower, removable, maintenance and service openings which are covered by removable, unnumbered cover plates.

Figure 8:
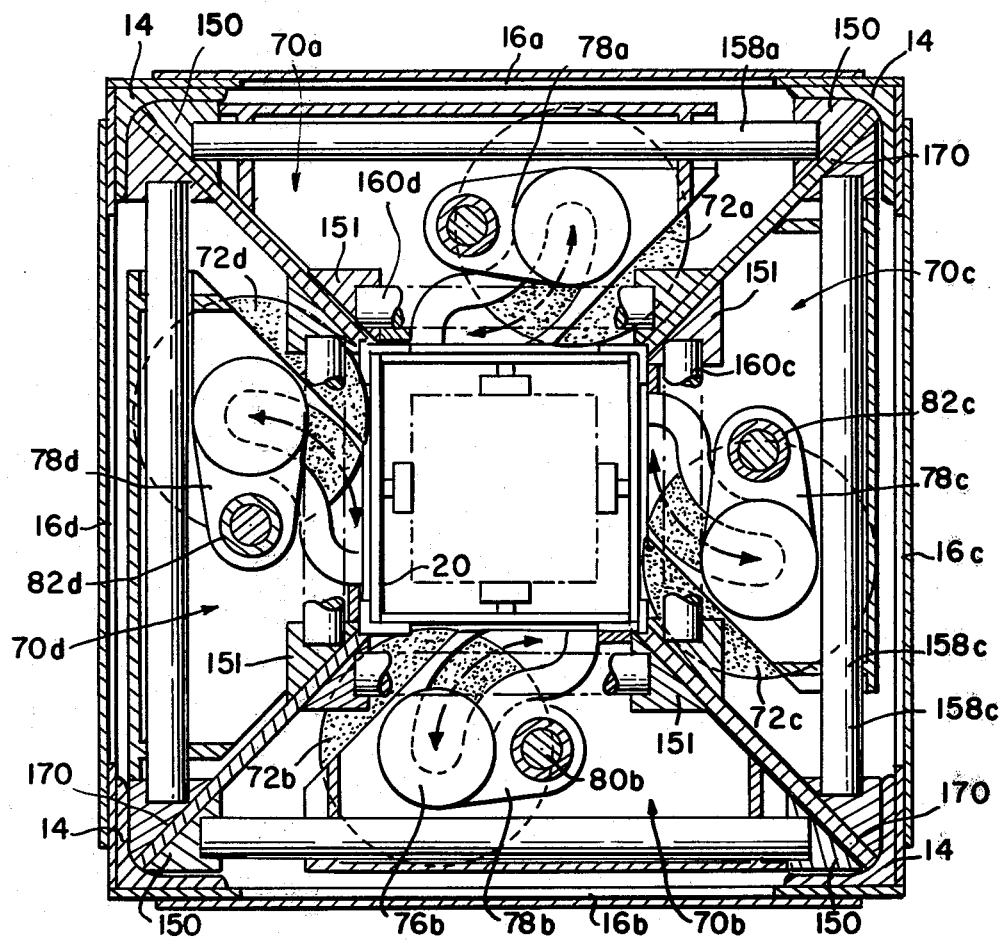
FIG. 8 is a section on line 8—8 of FIG. 4.

As more clearly shown in FIGS. 5 and 8, the main frame or housing 12 has a central passage extending from the bottom 18b to the top 18a which internal passage is designated 20. The center passage 20 is sized to receive the largest pile to be cut.

Interiorly of the frame 12 are three zones: an upper clamping zone generally designated 22; an intermediate zone 24 which houses the pile cutting saw assemblies and a lower section 26 housing lower pile clamping means.

Figure 2:
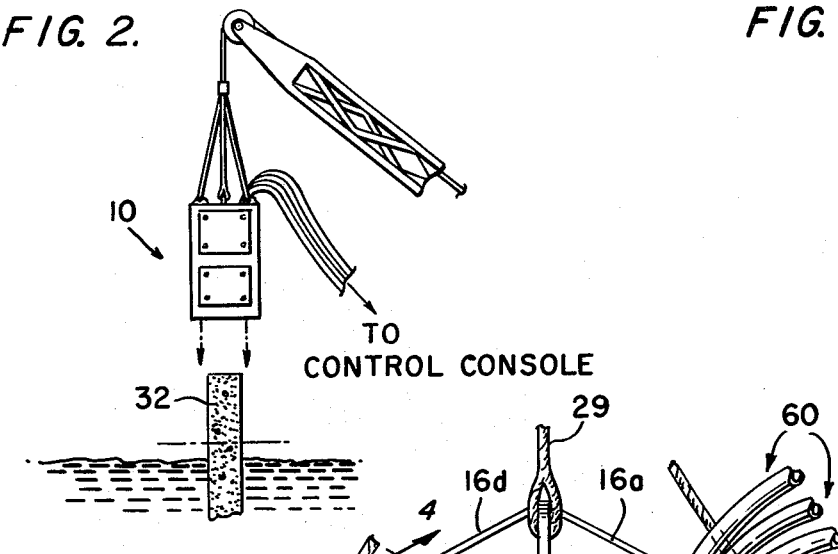
FIG. 2 illustrates the apparatus shown in FIG. 1 being lowered on to a pile to be cut.
Figure 3:
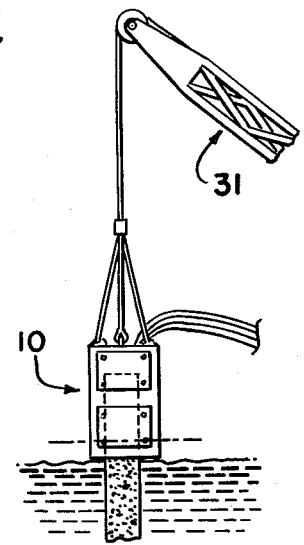
FIG. 3 is a view like FIG. 2 of the apparatus positioned on a pile.

The top of the frame assembly 18a includes a plurality and preferably four hitching dogs 28, two of which are illustrated in FIG. 1 attached in the corners; however, they may be positioned at the midpoint of each side as shown in FIGS. 2 and 3. The hitching dogs are attached to cables 29 of suitable hoisting means 31, whereby the frame may be lowered onto a pile to be cut and following cutting, the frame and cut portion of the pile lifted and transported to a place of release of the cut portion of the pile as illustrated in FIGS. 2 and 3.

UPPER PILE CLAMPING ASSEMBLIES

In the upper zone 22 of the main frame or housing 12 are mounted eight pile clamping elements each generally designated 30. Each of the assemblies 30 is mounted in a wall of the central passage 20 for movement into and out of engagement with the pile to be cut generally designated 32. Further, the clamping means 30 are mounted in two transverse zones A and B in vertical spaced arrangement so that once the pile 32 has been cut, the pile is stabilized in respect to the main frame 12.

Each of the clamping assemblies 30 includes a clamping dog 33 which may be provided with teethlike gripping elements 34 on a surface thereof. The dogs 33 are mounted for pivotal movement on a shaft 36 carried by members 38 forming a portion of the internal framing of the main frame 12. The dogs are pivoted in the direction of the directional arrows 40 by hydraulic rams generally designated 42 pivoted at one end 44 to the main frame and pivoted at the ram end as at 46 to its dog 33.

The hydraulic rams 42 are connected to a supply of hydraulic fluid via valve bank 48 and logic module 49. The valve bank 48 is connected to one of the pressure fluid supply and return lines generally designated 60. The hydraulic rams for the plural clamping means are connected to the valve bank 48 attached to one side of the frame 12 so an operator in a boat or barge or the like can properly position the pile cutting apparatus on the pile to be cut. The saw and saw carriage actuating means are positioned remote from the housing as the cutting operation is sequential in nature and does not require visual inspection as to be more fully set forth hereinafter. Further, it will be recognized that the sequential cutting operation may be programed once the cutting sequence is initiated.

Four clamping means generally designated 50 are provided in the lower portion 26 of the main frame and each of the clamping means 50 includes a hydraulic cylinder 52, a piston rod 54, and clamping pad 56. Again, one of the lower clamping means 50 is provided in each wall 58a, b, c, and d, forming the pile receiving well 20. Each of the hydraulic cylinders 52 is hydraulically connected to the valve means 48.

In connecting the plural clamping assemblies 30 and 50, via the valve means 48, a preferred arrangement is such that all of the clamps extending through walls 58a and 58c are energized and after determining that the main frame 12 is properly aligned to the pile and at the proper elevation, then the operator energizes the hydraulic rams associated with the clamping means in walls 58b and 58d. In the drawings for simplicity, the hydraulic lines to and from each of the rams 42 and 50 are not illustrated; however, the main hydraulic supply lines are illustrated and designated 60.

THE SAWING ASSEMBLIES

Referring now to FIGS. 5 through 15, in the preferred embodiment of the present invention, the pile cutting apparatus includes four saw assemblies, one in each of the quadrants A', B', C' and D', which assemblies are generally designated 70a, b, c, and d.

Each saw assembly 70a, b, c, and d includes a circular saw 72a, b, c, and d respectively, which circular saws are mounted on spindles 74a, b, c, and d, which spindles are driven by fluid pressure actuated or electric motors 76a, b, c, and d, which motors are mounted on plates or arms 78a, b, c, and d.

The plates or arms 78a-d are journaled for oscillation on shafts 80a, b, c, and d, rotatably supported in bearings 82a, b, c, and d.

Figure 9:
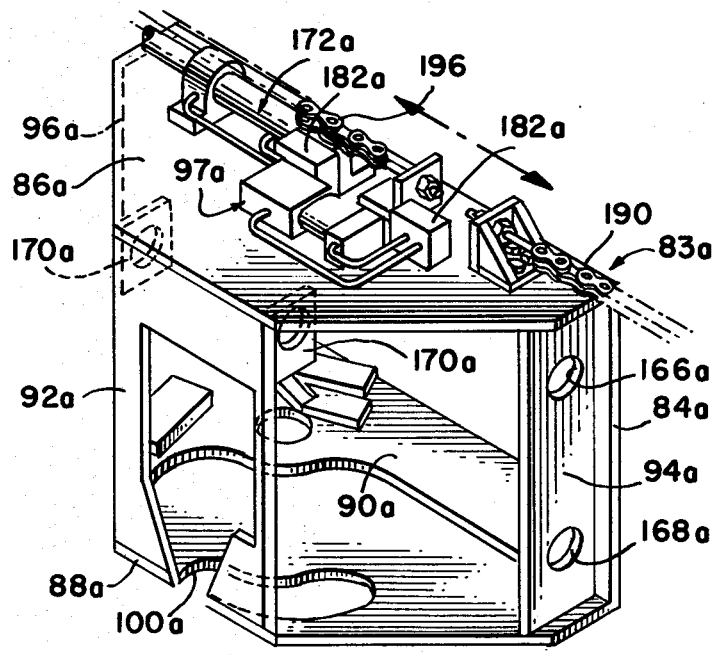
FIG. 9 is a perspective view of one of the circular saw carriage assemblies.

Referring specifically to FIG. 9, each carriage 83a-d is formed from a backplate 84a, top plate 86a, bottom plate 88a, an intermediate plate 90a, a front plate 92a, and a pair of small end plates 94a, and 96a. The top surface of top plate 86a supports a linear to rotary actuator 97a for shaft 80a of saw assembly 70a. The linear to rotary actuator will be described in reference to FIG. 7. The under surface of the top plate 86a has secured thereto a pillow block for the shaft 80a. The lower plate 88a has a curvilinear track like opening therein designated 100a which permits arcuate movement of the saw spindle 74a upon actuation of the linear to rotary actuator 97a.

The top surface of the intermediate plate 90a supports a plurality of stop members which cooperate with a stop arm 74a, FIGS. 4 and 10, journaled to the shaft 80a and fixed to the saw motor housing 76a.

Figure 14:
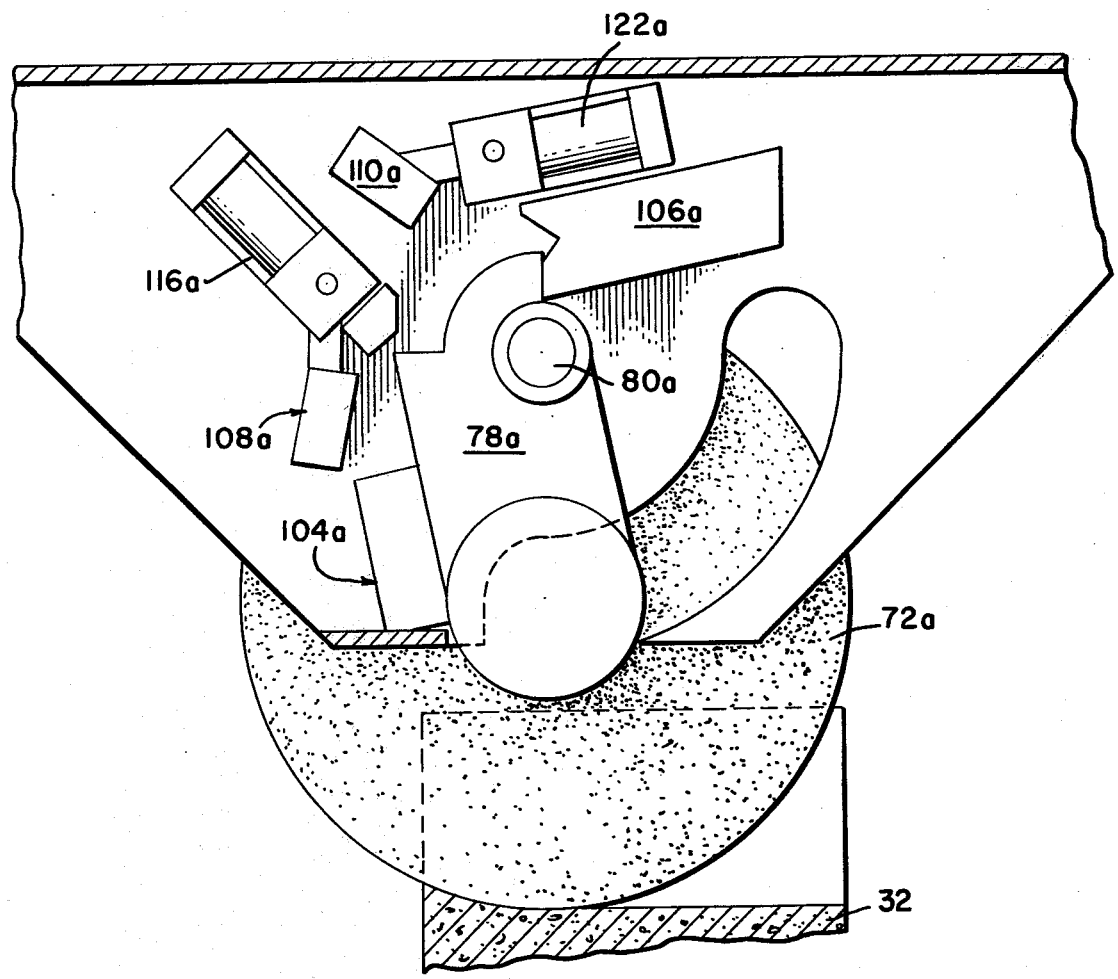
FIG. 14 is a view like FIGS. 11 and 12 showing the saw in its final cutting position.

Referring now to FIGS. 10, 12 and 14, each stop arm 78a, b, c, and d is shaped to provide a pair of spaced stop plate surfaces 109a, b, c, and d and 111a, b, c, and d. The function of these surfaces will be described only for movable stop arm 78a on carriage 83a, it being recognized that each of the other carriages 83b, c, and d is of identical construction.

The top surface of plate 90a has secured thereto three rigid stop members 104a, 106a and 125a and a pair of movable stop members 108a and 110a. Movable stop member 108a is linked by arm 112a to the rotary shaft 114a of a linear to rotary actuator 116a which may be of a type equivalent to linear to rotary actuator 97, which is to be described in reference to FIG. 7.

Movable stop member 110a is connected to a pivot arm 118a, which is journaled to shaft 120a of linear to rotary actuator 122a. Moveable stop 108a has two positions, the first of which is shown in FIG. 10, wherein the stop member is out of contact with the moveable arm 78a and the position shown in FIG. 12 wherein contact is made between surface 124a and the surface 109a of the moveable stop arm 78a to wedge the stop 108a against fixed block 125a. Similarly, moveable stop member 110a has two positions, the first of which is illustrated in FIG. 10 wherein the block 110a is in bearing engagement with surface 130a of fixed block 106a and surface 111a of arm 78a while the second position is shown in FIG. 12 in full lines.

It will be noted that in FIG. 12, the moveable stop member 108a, when in the arm 78a engaging position, is wedged between fixed block 125a, thus, the thrust of the saw cutting through the pile is not taken up by the pivot arm 112a, or the small shaft 114a of the linear to rotary actuator.

In a preferred embodiment of the present invention, the first stop for the saw provides for about 36 degree angular rotation of the arms 78a, b, c, and d and in the second motion about 56 degrees total movement. Now referring to FIG. 14, the saw has moved a total of 90 degrees and the lever arm is in contact with the fixed stop members 104a and 106a welded, for example, to the top surface of partition 90a of the moveable carriage.

Figure 15:
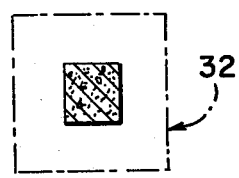
FIG. 15 is a view like FIGS. 11 and 12 following the third saw cut.

FIGS. 11, 12, and 15 illustrate the effects of a first cut with the four saws at the 36 degree rotation of the saw pivot arm; at the second cut of 56 degrees with the four saws in actuation and in FIG. 14, a 90 degree cut by, for example, saws 72a and 72b. The fourth cut wherein only saws 72c and 72d are actuated finishes the pile cutting procedure. The four step sequence only takes place for very small piling, i.e., 10"×10" or smaller because of blade conflict. On larger piling three steps are used with all four saws rotating during each step.

CARRIAGE ACTUATION MEANS

As herinbefore indicated, each of the four carriages 83a, b, c, and d reciprocates in a plane transverse to the longitudinal axis of the pile to be cut. Referring now particularly to FIGS. 5, 6, 8, and 9, which illustrate the plural carriages 83a-d, which are mounted for sliding motion on three shafts supported in corner blocks 150 and 151, forming a part of the main frame 12 of the machine. The upper two shafts are designated 158a, b, c, and d and 160a, b, c, and d, while the lower slide bar is designated 162a, b, c, and d, respectively, and these bars pass through openings 166a-d and 168a-d containing slide bearings, not shown, in side plates 94a-d and 96a-d of each carriage, while rod 160a-d is mounted for sliding motion on pillow blocks 170a-d secured within each carriage.

Each of the carriages 83a-d moves on its respective rods between the limits of diagonal web plates 170 and each of the carriages 83a-d is caused to reciprocate by hydraulic ram assemblies and control valves generally designated 172a-d, one of which 172a is illustrated in detail in FIGS. 6 and 9.

The hydraulic ram 172a comprises a cylinder 174a, a piston rod 176a, the extended end member 178a of which is attached to one of the diagonal plate members 170, whereby when pressure fluid is directed into end 180a of, for example, cylinder 174a via adjustable flow control valve 182a, the carriage is caused to move in the direction of directional arrow 184a (FIG. 6) by pressure exerted against the wall 170. Movement in the opposite direction is brought about by shifting the pressure fluid to the opposite end 186a of cylinder 174a drawing the cylinder and its attached carriage toward its respective wall 170.

Since, as hereinbefore described, each of the carriages 83a-d has its own hydraulic ram 172a-d for movement of the respective carriages, means are provided to synchronize the carriage movements. The synchronizing means comprises four chains 190, 192, 194 and 196.

As more clearly shown in FIG. 5, chain 190 is anchored at one end to the top of carriage 83a while the other end is attached to the top of carriage 83c. One end of chain 192 is attached to the top of carriage 83c while the other end is attached to the top of 82b carriage. Chain 194 is attached to the top of carriage 83b while the opposite end is attached to carriage 83d. Likewise one end of chain 196 is attached to the top of carriage 83a and the other end attached to the top of carriage 83d. The chains 190, 192, 194 and 196 pass about idle sprockets rotatably mounted in each of the four diagonal walls 170. Thus, it will be seen with the four chains interconnecting the four carriages that motion of any one carriage will be related to each of the other carriages; thus, synchronizing in a very simple manner the actuation of the four hydraulic carriage moving rams 172a-d.

Hydraulic fluid for the four carriage actuating adjustable flow control valves 182a-d is derived from the main hydraulic fluid lines 60 hereinbefore described.

Referring now to FIG. 7, a typical linear to rotary actuator is illustrated and comprises a pair of hydraulic cylinders 220 and 222 within which are mounted for reciprocation, a pair of pistons 224 and 226 respectively. The assembly also includes a pressure fluid reservoir 228 within which is mounted a cogwheel 230 on the output shaft 80a-d and a chain 232 trained about the cogwheel 230. Opposite ends of the chain are connected to the pair of pistons 224 and 226. The common end plate 236 is provided with a pair of hydraulic lines, 238 for cylinder 220 and 240, for cylinder 222, selectively connected to line pressure and to the sump.

In operation, the reservoir 228 is filled with hydraulic fluid at line pressure which also fills each of the cylinders on the chain ends of the pistons. At this time since both pistons 224 and 226 are of equal diameter, the pressure differential across both pistons is equal and there is no tendency for shaft rotation. However, when pressure is applied via line 238, the pressure differential across piston 224 is lessened and therefore, causes piston 226 to drive down the cylinder 222, rotating the output shaft 80a-d. For opposite direction motion, pressure fluid connected to line 238 is vented to tank and piston 224 is connected to line pressure and becomes the power piston and rotation is in the opposite direction.

OPERATION

A typical pile cutting operation is commenced by the operator of the hoisting device 31 lowering the frame 12 onto pile 32 to the proper location for pile cutting. Alignment can be sensed by opening the door in side panel 16b and at this point the clamping means 30 in upper and lower banks A and B in zones A' and C' are extended. After the operator has observed that the housing is properly aligned on the pile and its elevation is proper then the gripping members in upper and lower zones A and B of banks B' and D' are actuated to apply the final upper clamping force. The lower pile gripping clamps 52 are then extended to grip the pile below each of the saw blades 72a-d. The operator then initiates the programmed sequence which starts each of the saw motors 76a-d and at the same time directs spray onto the saw blades via the plural upper and lower spray nozzles 71 (FIG. 4) of the drawing. With the saw blades rotating and the spray actuating, the linear to rotary actuators 122a-d are rotated to place the stop members 110a-d into the position illustrated in FIG. 10 and once in place, the linear to rotary actuators for shafts 80a-d are energized placing the equipment as illustrated in FIG. 10. Thereafter, the plural hydraulic rams 172a-d are energized causing each of the saw carriages to move the saw blades 72a-d across the pile and once the full traverse is made, the pile would look substantially as illustrated in FIG. 11.

At this point, the movable stop arm linear to rotary actuators 80a-d are reversed, returning each of the saws to its original position. Then each of the carriages are retracted to their original position.

Next, the linear to rotary actuators 116a-d are energized to place stop members 108a-d into the position illustrated in FIG. 12. Energization of the movable stop arm linear to rotary actuators 97a-d brings the saw and arm into the FIG. 12 position. When in position, the linear actuators 172a-d are energized making the second saw cut so that the cut pile would look as illustrated in FIG. 13.

Upon retraction of the stop member 108a-d and return of the arms and carriages to the initial starting position completes the second cycle. For the next or third saw cut, only the linear to rotary actuators for the stop arms associated with the carriages 83a and 83b are energized so that the saws and their stop arms at stations 82a and 82b are in position illustrated in FIG. 14. Traversal of the four tables or carriages then brings about cutting of the pile as illustrated in FIG. 15. Return of the pair of saw stop arms 78a and b and the four carriages completes the third saw cut. Next, the arms 78c and d are caused to rotate a full ninety degrees whereby the fourth traversal of the saw carriages substantially completes cutting of the pile. The small remaining center core of the pile prevents damage to the saw blades.

The two saw motors on carriages 83c and d are returned to their starting position and the operator can then release the lower pile clamping mechanisms 52 so that lifting the entire frame 12 causes the remaining center core of the pile to snap and the cut section of the pile 32 is lifted and maneuvered with the housing to a point of disposal. At the point of disposal, all of the upper clamping members are released, permitting the pile to pass through the channel 20 in the housing 12. A new pile cutting procedure can then commence.

In the present form of the invention the third cutting step for piles larger than 10"×10" is carried out with all four saw blades functioning and the fourth cutting step is not carried out.

From the foregoing description of a preferred embodiment of the present invention, it will be recognized by those skilled in the art that various modifications may be made in the specific form of the device without departing the scope of the present invention as defined in the amended claims.

I claim:

1. A pile cutting machine comprising a main frame said main frame being quadrangular in transverse cross-section and shaped to receive the pile to be cut in a passage extending through the center of the frame, a plurality of extensible pile-gripping clamp means carried by the upper portion of the main frame, a plurality of extensible pile gripping clamp means carried by the lower portion of the frame, a plurality of circular saw assemblies mounted between the upper and lower clamp means with the axis of rotation of each saw parallel to the axis of the pile to be cut, a carriage for each saw, means mounting each carriage for reciprocation in a plane normal to the axis of rotation of each saw assembly, means for swinging each saw toward and away from the pile to be cut and further means for reciprocating each saw carriage.

2. The invention defined in claim 1 wherein there are eight extensible pile gripping clamps in the upper portion of the main frame with two superimposed clamps carried by each of the four sides of the quadrangular frame.

3. The invention defined in claim 2 wherein there are four extensible pile gripping clamps means carried by the lower portion of the main frame, one in each of the four side walls of the quadrangular frame.

4. The invention defined in claim 1 wherein there are four circular saw assemblies mounted between the upper and lower clamp means.

5. The invention defined in claim 4 wherein there are four saw carriages, one for each of the four circular saws.

6. The invention defined in claim 5 wherein each of the saw carriages are interconnected by means for simultaneous reciprocation thereof.

7. The invention defined in claim 6 wherein circular saws are energized in synchronism.

8. The invention defined in claim 7 wherein the means for swinging each saw toward and away from the pile to be cut are energized in unison and in opposed pairs.

9. The invention defined in claim 1 wherein there are four saw assemblies and the means for swinging each of said saw assemblies toward and away from the pile are provided with stop means wherein the saws may be sequentially rotated approximately about 36°, 56°, and 90°.

10. A method for cutting piles comprising the steps: positioning a frame, of quadrangular cross-section and having a vertical passage therethrough, onto a pile to be cut; gripping said pile above the cut to be made with a plurality of extensible clamps; gripping said pile below the cut to be made with a plurality of extensible clamps; causing a plurality of circular saws to make a plurality of sequential saw cuts in the pile until the pile is substantially severed; releasing the lower pile grips; and lifting the frame and the cut portion of the pile from the main portion of the pile.

* * * * *